US008764596B2

(12) United States Patent
Tryon et al.

(10) Patent No.: US 8,764,596 B2
(45) Date of Patent: Jul. 1, 2014

(54) AUXILIARY TRANSMISSION OIL PUMP INTEGRATION

(75) Inventors: Eric S. Tryon, Indianapolis, IN (US); William S. Reed, Greenfield, IN (US); Matthew R. Knoth, Indianapolis, IN (US)

(73) Assignee: GM Global Technology Operations LLC

( * ) Notice: Subject to any disclaimer, the term of this patent is extended or adjusted under 35 U.S.C. 154(b) by 1404 days.

(21) Appl. No.: 12/368,617

(22) Filed: Feb. 10, 2009

(65) Prior Publication Data
US 2010/0050626 A1 Mar. 4, 2010

Related U.S. Application Data

(60) Provisional application No. 61/093,111, filed on Aug. 29, 2008.

(51) Int. Cl.
*F16H 47/07* (2006.01)
(52) U.S. Cl.
USPC .......................................................... 475/78
(58) Field of Classification Search
USPC .................................................. 475/31–148
See application file for complete search history.

(56) References Cited

U.S. PATENT DOCUMENTS

| 3,937,104 | A | * | 2/1976 | Van Gorder | 475/60 |
| 5,152,190 | A | * | 10/1992 | Jurgens et al. | 74/606 R |
| 5,189,930 | A | * | 3/1993 | Kameda | 74/650 |
| 6,390,947 | B1 | * | 5/2002 | Aoki et al. | 477/3 |
| 7,300,375 | B2 | * | 11/2007 | Petrzik | 475/119 |
| 7,351,175 | B2 | * | 4/2008 | Kraxner et al. | 475/127 |
| 7,846,061 | B2 | * | 12/2010 | Steinborn et al. | 477/5 |
| 8,070,636 | B2 | * | 12/2011 | Gierer et al. | 475/119 |
| 2004/0063533 | A1 | * | 4/2004 | Silveri et al. | 475/116 |
| 2007/0117665 | A1 | * | 5/2007 | Yamazaki | 474/28 |
| 2009/0011886 | A1 | * | 1/2009 | Schondelmaier | 475/5 |
| 2010/0093477 | A1 | * | 4/2010 | Foster et al. | 475/116 |

FOREIGN PATENT DOCUMENTS

WO WO2006016797 2/2006

* cited by examiner

*Primary Examiner* — Jeffrey J Restifo
*Assistant Examiner* — Erez Gurari

(57) ABSTRACT

A transmission system of a vehicle comprises a pump, an auxiliary pump, and a transmission. The pump pressurizes transmission oil when an engine is operating. The auxiliary pump operably coupled to the pump and located parallel to the pump that pressurizes the transmission oil when the engine is not operating. The transmission selects a gear ratio based on the pressurized transmission oil.

11 Claims, 3 Drawing Sheets

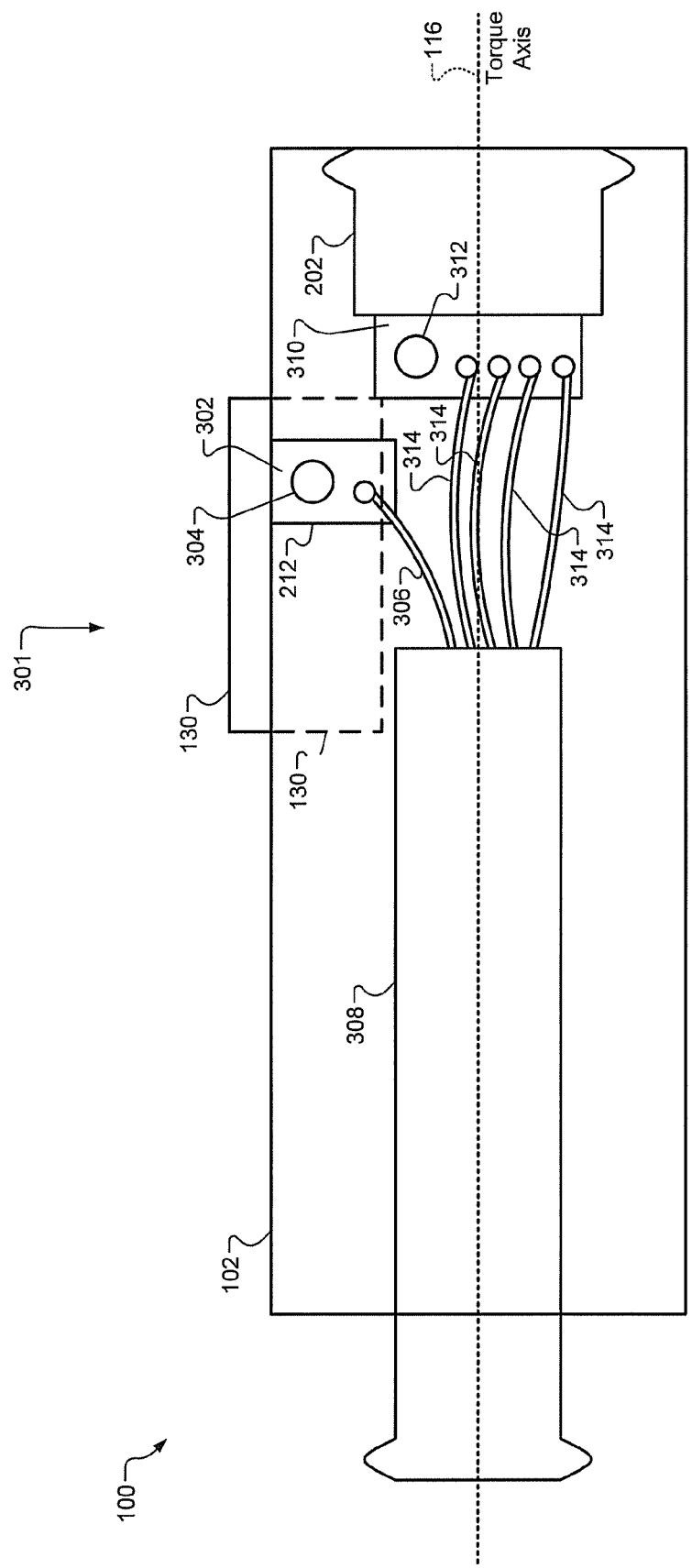

AUXILIARY TRANSMISSION OIL PUMP INTEGRATION

CROSS-REFERENCE TO RELATED APPLICATIONS

This application claims the benefit of U.S. Provisional Application No. 61/093,111, filed on Aug. 29, 2008. The disclosure of the above application is incorporated herein by reference.

FIELD

The present disclosure relates to vehicle transmissions and more particularly to transmission oil pumps for vehicle transmissions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transmission receives a torque from an engine and/or one or more electric motors. The transmission transfers torque to one or more wheels of a vehicle through a planetary gear set. A gear ratio of the transmission is selected based on which components of the planetary gear set are linked or engaged.

The transmission includes brakes, clutches, bands, and/or other devices that link components of the planetary gear set. The gear ratio of the transmission is selected based upon the statuses of the brakes, clutches, bands, or other devices. A sump provides a reservoir of transmission oil that may be pressurized by a transmission oil pump. The transmission oil pump is connected to a driven shaft of the transmission. The engine, the electric motors, and/or a battery may power the transmission oil pump.

The transmission oil pump draws transmission oil from the sump and outputs the pressurized transmission oil to pressure control devices of the transmission. The pressure control devices selectively apply the pressurized transmission oil to the brakes, clutches, bands, and/or other friction devices. Application of the pressurized transmission oil actuates the friction device to which the fluid is applied to change the gear ratio of the transmission.

SUMMARY

A transmission system of a vehicle comprises a pump, an auxiliary pump, and a transmission. The pump pressurizes transmission oil when an engine is operating. The auxiliary pump operably coupled to the pump and located parallel to the pump that pressurizes the transmission oil when the engine is not operating. The transmission selects a gear ratio using the pressurized transmission oil.

In other features, the auxiliary pump includes an auxiliary pump motor that powers the auxiliary pump.

In still other features, the auxiliary pump motor is powered by a battery.

In further features, the transmission includes a window, and an end of the auxiliary pump is operably coupled to the window.

In still further features, the transmission system further comprises a gasket. The gasket is located between the end of the auxiliary pump and the window.

In other features, the transmission extends a first distance toward a rear end of the vehicle. The auxiliary pump extends a second distance toward the rear end, and the second distance is one of less than or equal to the first distance.

In still other features, the auxiliary pump is located on a passenger side of the vehicle.

In further features, the transmission extends a first vertical distance toward a surface upon which the vehicle sits. The auxiliary pump extends a second vertical distance toward the surface, and the second vertical distance is one of less than or equal to the first vertical distance.

In still further features, the auxiliary pump extends below a top of an oil pan of the transmission.

In other features, the transmission system further comprises first and second high-voltage (HV) connectors for one or more electric motors. The auxiliary pump includes a third HV connector, and the auxiliary pump and the third HV connector are located between the first and second HV connectors.

In still other features the first, the second, and the third HV connectors are routed to a battery.

In further features, the transmission includes a window through a housing and includes a manifold body operably coupled to a bottom of the auxiliary pump through the window that receives the transmission oil.

In still further features, the pump includes a suction filter located proximate to the manifold body that decontaminates the transmission oil from suspended impurities.

In other features, the auxiliary pump includes a tube assembly that transfers the pressurized transmission oil from the auxiliary pump to a valve body and to a transmission pump housing that regulates the transmission oil.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is an exemplary bottom view of the transmission system according to the principles of the present disclosure.

DETAILED DESCRIPTION

Figure 1:
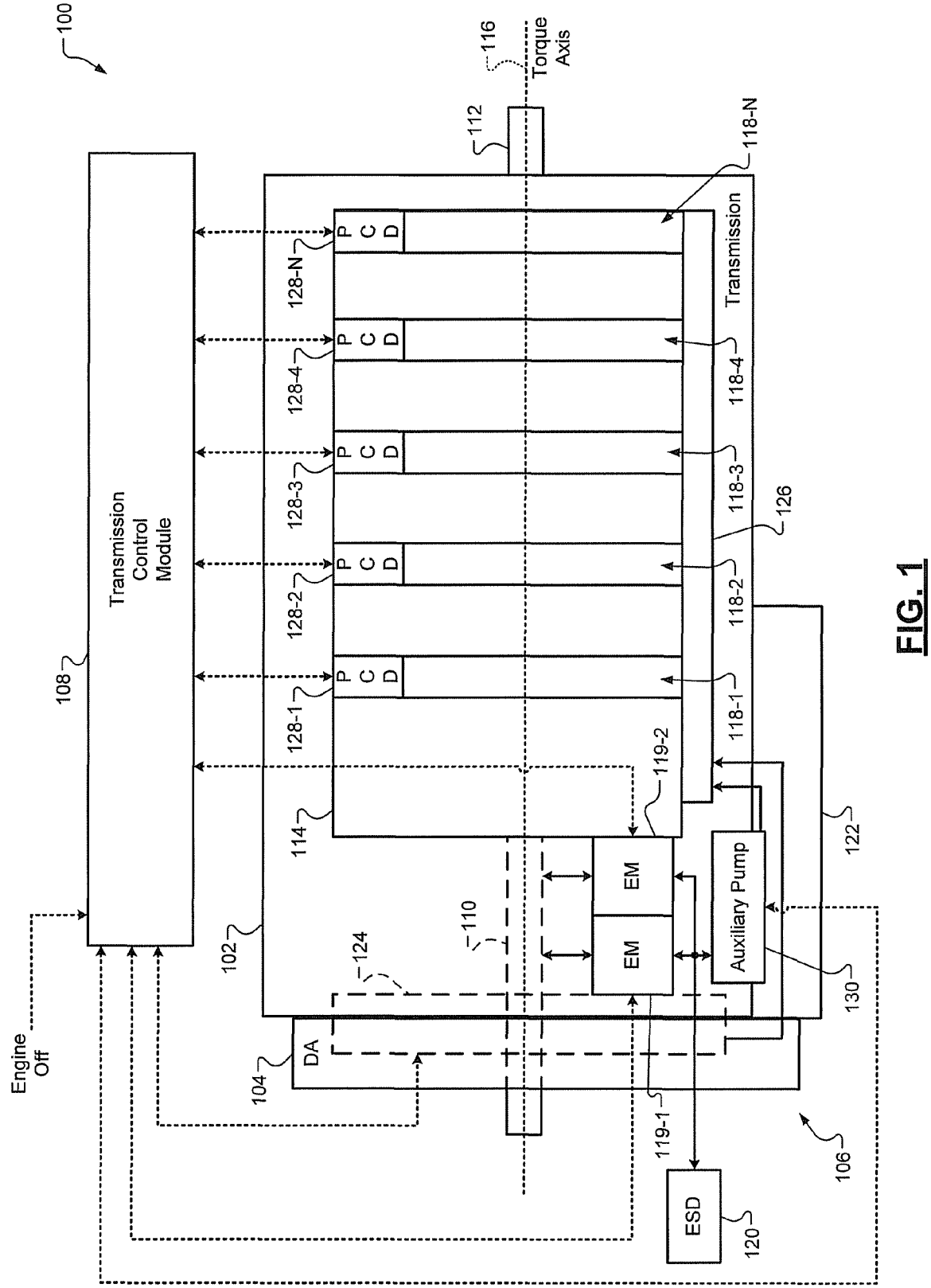
FIG. 1 is a functional block diagram of an exemplary transmission system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A transmission system includes a transmission that outputs torque along a torque axis (i.e., a centerline). A pressure control system includes a primary oil pump that provides pressurized transmission oil to various components of the transmission system. The primary oil pump is powered via the torque transferred along the torque axis.

An auxiliary oil pump also provides pressurized transmission oil to the various components of the transmission system. The auxiliary oil pump, however, is operable when primary oil pump is not powered. The auxiliary pump is powered by an electronic storage device and an electric motor.

The auxiliary oil pump according to the principles of the present disclosure is located at a predetermined distance from the torque axis. The auxiliary oil pump is coupled to an outside casing of the transmission. The auxiliary oil pump may be located on a passenger side of transmission and may be located above a transmission oil pan associated with the transmission. The auxiliary pump according to the principles of the present disclosure does not add to the length of a transmission system and allows for clearance requirements (e.g., ground and/or exhaust) to be met.

Referring now to FIG. 1, a functional block diagram of an exemplary transmission system 100 is shown. The transmission system 100 includes a transmission 102, a damper assembly (DA) 104, a pressure control system 106, and a transmission control module 108. The damper assembly 104 selectively transfers torque output by an engine (not shown) to an input shaft 110 of the transmission 102.

The transmission 102 transfers torque from the input shaft 110 to an output shaft 112 via a planetary gear set 114. The torque is transferred from the input shaft 110 to the output shaft 112 about a torque axis 116. The transmission 102 includes the planetary gear set 114 and a plurality of friction devices 118-1-118-N (collectively referred to as friction devices 118). The friction devices 118 may include, for example only, brakes, clutches, bands, and/or other suitable friction devices.

The transmission 102 may also include one or more electric motors 119-1 and 119-2 (collectively referred to as electric motors 119). While two electric motors 119 are shown, the transmission 102 may include more or fewer electric motors. The electric motors 119 selectively drive the output shaft 112 of the transmission 102. For example only, the electric motors 119 may be used to drive the output shaft 112 while the engine is shutdown and/or supplement the torque output by the engine. In other implementations, the electric motors 119 may drive the planetary gear set 114.

The electric motors 119 are powered by a power source, such as an energy storage device (ESD) 120. One or more of the electric motors 119 may be operated as a generator. When operating as a generator, the electric motors 119 generates power for the ESD 120, other vehicle systems or devices, and/or the electric motors 119.

The pressure control system 106 includes a sump 122, a primary pump 124, a fluid line 126, pressure control devices (PCDs) 128-1-128-N, (collectively referred to as PCDs 128), and an auxiliary pump 130. A gear ratio (e.g., first gear, second gear, . . . ) and a transmission status (e.g., park, neutral, drive, or reverse) is selected based on the orientation of the planetary gear set 114. More specifically, the gear ratio and the transmission status are selected based on which components of the planetary gear set 114 are engaged (i.e., linked). The components of the planetary gear set 114 are selectively engaged and disengaged by the friction devices 118.

The sump 122 provides a reservoir of transmission oil that is used throughout the transmission system 100. When powered, the primary pump 124 selectively draws transmission oil from the sump 122 and pressurizes the transmission oil within the fluid line 126. The primary pump 124 provides the pressurized transmission oil to the fluid line 126 based on signals from the transmission control module 108. The fluid line 126 provides the pressurized transmission oil to the PCDs 128.

The PCDs 128 selectively apply the pressurized transmission oil to selected ones of the friction devices 118 based on signals from the transmission control module 108. The selected ones of the friction devices 118 engage or disengage associated components of the planetary gear set 114. In this manner, the PCDs 128 selectively apply and remove transmission oil pressure from selected ones of the friction devices 118 to select the gear ratio and/or the transmission state.

The primary pump 124 is powered by rotation of the input shaft 110. Accordingly, the primary pump 124 is shutdown when the engine is shutdown. The transmission control module 108 communicates with the engine, an engine control module and a hybrid control module (not shown). The transmission control module 108 receives an engine off signal when the engine is not operating (i.e., shutdown).

The auxiliary pump 130 is selectively operated when the engine and/or the primary pump 124 is shutdown. The auxiliary pump 130 is powered by the ESD 120. The hybrid control module controls operation of the auxiliary pump 130. In other implementations, the transmission control module 108 may control operation of the auxiliary pump 130.

Similar to the primary pump 124, the auxiliary pump 130 draws transmission oil from the sump 122 and provides pressurized transmission oil to the fluid line 126. The auxiliary pump 130, however, is capable of providing pressurized transmission oil to the fluid line 126 at times when the engine is shutdown. The auxiliary pump 130 therefore allows continued performance of transmission and other vehicle functions during times when the engine is shutdown.

The auxiliary pump 130 according to the principles of the present disclosure is located at a distance away from the torque axis 116 of the transmission 102. The auxiliary pump 130 is electrically powered and is therefore independent from the torque input to the transmission 102. The auxiliary pump 130 may be located on a passenger side of the vehicle. The auxiliary pump 130 may be any suitable type of pump and may have any suitable characteristics. For example only, the auxiliary pump 130 may operate based on a 300 V input.

Figure 2:
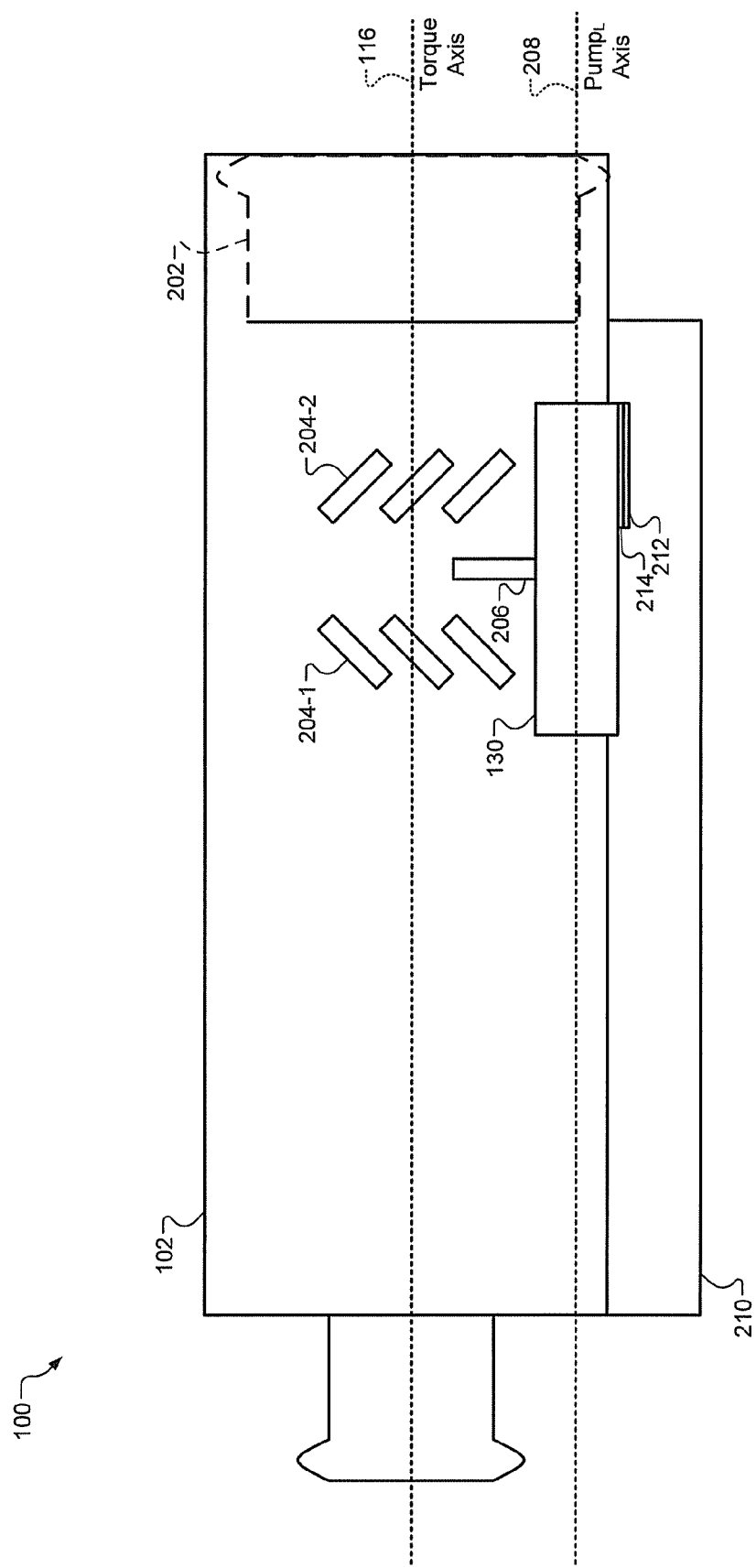
FIG. 2 is an exemplary passenger side view of the transmission system according to the principles of the present disclosure.

Referring now to FIG. 2, an exemplary passenger side view of the transmission system 100 is presented. The primary pump 124 is housed within a pump housing 202. Connectors 204-1 and 204-2 (collectively referred to as connectors 204) are coupled to an outer casing of the transmission 102. Electrical power is provided to the electric motors 119 via the connectors 204. For example only, the connectors 204 may be high voltage connectors, such as 300 V connectors.

Electrical power is provided to the auxiliary pump 130 via a connector 206. The auxiliary pump 130 may be located such that the connector 206 of the auxiliary pump 130 is near the connectors 204. Locating the connector 206 near the connectors 204 may allow bundling of electrical connecting accessories associated with the connectors 204 and the connector 206.

The auxiliary pump 130 includes a longitudinal axis 208 (i.e., a pump$_L$ axis). The auxiliary pump 130 is located with a distance between the auxiliary pump 130 and the torque axis 116 as shown in FIG. 2. The distance is greater than zero. The auxiliary pump 130 may be oriented such that the longitudinal axis 208 of the auxiliary pump 130 is parallel to the torque axis 116 of the transmission 102. The auxiliary pump 130 is also coupled to the outer casing of the transmission 102. For example, the auxiliary pump 130 may be coupled to the outer casing of the transmission 102 at a location at which the auxiliary pump 130 has direct access to the transmission oil in the sump 122 or a transmission oil pan 210. The auxiliary pump 130 may also be located above the level at which the transmission oil pan 210 meets the transmission 102.

The outer casing of the transmission 102 includes a transmission case window 212 for the auxiliary pump 130. More specifically, the auxiliary pump 130 is coupled with the outer casing of the transmission 102 through the transmission case window 212. An auxiliary pump gasket 214 is positioned between the auxiliary pump 130 and the transmission case window 212 on the transmission 102.

The transmission oil pan 210 is a reservoir for the transmission oil from the sump 122. The primary pump 124 and/or the auxiliary pump 130 may draw transmission oil from the transmission oil pan 210 and pressurize the transmission oil. The pump housing 202 receives the pressurized transmission oil from the primary and auxiliary pumps 124 and 130 and provides the pressurized transmission oil to the PCDs 128. For example only, the pump housing 202 may include a valve spring system that regulates the pressurized transmission oil.

Referring now to FIG. 3, an exemplary bottom view of the transmission system 100 is presented. The transmission 102 is depicted in FIG. 3 without the transmission oil pan 210. The passenger side of the transmission 102 is indicated at 301. The auxiliary pump 130 includes a manifold body 302 that is coupled to the bottom side of the auxiliary pump 130. The manifold body 302 is inserted through and coupled to the transmission case window 212. In this manner, the manifold body 302 may breach (i.e., protrude past) the level at which the transmission oil pan 210 meets the transmission 102.

The manifold body 302 includes a suction orifice 304 through which the auxiliary pump 130 draws the transmission oil. In various implementations, a suction filter (not shown) may be implemented with the suction orifice 304, and the suction orifice 304 may draw the transmission oil through the suction filter. In this manner, the transmission oil is filtered before being pressurized by the auxiliary pump 130. The auxiliary pump 130 outputs pressurized transmission oil via an auxiliary oil line 306 to a valve body 308. The valve body 308 is coupled to the transmission control module 108 and routes the pressurized transmission oil to the pump housing 202 to be regulated.

Similar to the auxiliary pump 130, the primary pump 124 includes a primary manifold body 310. The primary manifold body 310 is coupled to the bottom surface of the pump housing 202 of the primary pump 124. The primary manifold body 310 includes a primary suction orifice 312 through which the primary pump 124 draws the transmission oil. A filter (not shown) may also be implemented with the primary suction orifice 312. When powered, the primary pump 124 draws in the transmission oil, pressurizes the transmission oil, and provides the pressurized transmission oil to the valve body 308 via a plurality of primary oil lines 314.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A transmission system of a vehicle, comprising:
   a transmission housing that includes an aperture formed through the transmission housing;
   a valve body that is disposed within the transmission housing;
   a pump that is powered by rotation of an input shaft, that is disposed within the transmission housing, that pressurizes transmission oil when an engine is operating, and that outputs the pressurized transmission oil to the valve body;
   a first manifold body that is disposed within the transmission housing, wherein the pump draws transmission oil from a sump via the first manifold body;
   an auxiliary pump that is coupled to the transmission housing, that pressurizes the transmission oil when the engine is not operating, and that outputs the pressurized transmission oil to the valve body,
   a plurality of pressure control devices (PCDs) that select a gear ratio using the pressurized transmission oil; and
   a second manifold body that is disposed within the transmission housing and that is coupled to the auxiliary pump through the aperture of the transmission housing, and
   wherein the auxiliary pump draws transmission oil from the sump via the second manifold body.

2. The transmission system of claim 1 wherein the auxiliary pump includes an auxiliary pump motor that powers the auxiliary pump.

3. The transmission system of claim 2 wherein the auxiliary pump motor is powered by a battery.

4. The transmission system of claim 1 further comprising a gasket located between the auxiliary pump and the aperture.

5. The transmission system of claim 1 wherein the transmission housing extends a first distance toward a rear end of the vehicle, wherein the auxiliary pump extends a second distance toward the rear end, and wherein the second distance is one of less than or equal to the first distance.

6. The transmission system of claim 1 wherein the auxiliary pump is located on a passenger side of the vehicle.

7. The transmission system of claim 1 wherein the transmission housing extends a first vertical distance toward a surface upon which the vehicle sits, wherein the auxiliary pump extends a second vertical distance toward the surface, and wherein the second vertical distance is one of less than or equal to the first vertical distance.

8. The transmission system of claim 1 wherein the auxiliary pump extends below a top of an oil pan of the transmission.

9. The transmission system of claim 1 further comprising first and second high-voltage (HV) connectors for one or more electric motors,
   wherein the auxiliary pump includes a third HV connector, and
   wherein the auxiliary pump and the third HV connector are located between the first and second HV connectors.

10. The transmission system of claim 9 wherein the first, the second, and the third HV connectors are routed to a battery.

11. The transmission system of claim 1 wherein the pump includes a suction filter located proximate to the first manifold body that decontaminates the transmission oil from suspended impurities.

* * * * *